(12) United States Patent
Pae et al.

(10) Patent No.: US 10,498,187 B2
(45) Date of Patent: Dec. 3, 2019

(54) BRUSHLESS DIRECT CURRENT (BLDC) MOTOR OF FUEL PUMP FOR MOTOR VEHICLE

(71) Applicant: COAVIS, Sejong-si (KR)

(72) Inventors: Wan Sung Pae, Sejong-si (KR); Hyun Tae Lee, Sejong-si (KR); Jin Woo Han, Sejong-si (KR)

(73) Assignee: COAVIS, Sejong-si (KR)

( * ) Notice: Subject to any disclaimer, the term of this patent is extended or adjusted under 35 U.S.C. 154(b) by 335 days.

(21) Appl. No.: 15/400,241

(22) Filed: Jan. 6, 2017

(65) Prior Publication Data

US 2017/0201143 A1 Jul. 13, 2017

(30) Foreign Application Priority Data

Jan. 8, 2016 (KR) ........................ 10-2016-0002689

(51) Int. Cl.
*H02K 5/167* (2006.01)
*H02K 5/02* (2006.01)
*F04D 13/06* (2006.01)
*F04D 5/00* (2006.01)

(52) U.S. Cl.
CPC ........... *H02K 5/1672* (2013.01); *F04D 5/002* (2013.01); *F04D 13/06* (2013.01); *H02K 5/02* (2013.01)

(58) Field of Classification Search
CPC ........ H02K 5/1672; H02K 5/02; F04D 5/002; F04D 13/06
See application file for complete search history.

(56) References Cited

U.S. PATENT DOCUMENTS

| | | | | |
|---|---|---|---|---|
| 4,876,492 A * | 10/1989 | Lester | ..................... | F01P 7/164 318/400.08 |
| 7,411,326 B2 * | 8/2008 | Achor | ..................... | H02K 5/12 310/52 |
| 2004/0245878 A1 * | 12/2004 | Kim | ..................... | D06F 37/304 310/114 |
| 2005/0116562 A1 * | 6/2005 | Schlosser | ................. | H02K 5/15 310/89 |
| 2006/0279148 A1 * | 12/2006 | Baumgartner | ....... | H02K 5/1672 310/90 |

* cited by examiner

*Primary Examiner* — Emily P Pham
(74) *Attorney, Agent, or Firm* — McCoy Russell LLP

(57) ABSTRACT

Provided is a brushless direct current (BLDC) motor applied to a fuel pump for a motor vehicle, and more particularly, a BLDC motor of a fuel pump for a motor vehicle in which an end of a shaft of a rotor is coupled to a stator side to be rotated such that a length of the shaft is reduced.

3 Claims, 6 Drawing Sheets

PRIOR ART

BRUSHLESS DIRECT CURRENT (BLDC) MOTOR OF FUEL PUMP FOR MOTOR VEHICLE

CROSS-REFERENCE TO RELATED APPLICATIONS

This application claims priority under 35 U.S.C. § 119 to Korean Patent Application No. 10-2016-0002689, filed on Jan. 8, 2016, in the Korean Intellectual Property Office. The entire disclosure of which is incorporated herein by reference in its entirety for all purposes.

TECHNICAL FIELD

The following disclosure relates to a brushless direct current (BLDC) motor applied to a fuel pump for a motor vehicle, and more particularly, to a BLDC motor of a fuel pump for a motor vehicle in which an end of a shaft of a rotor is coupled to a stator side to be rotated such that a length of the shaft is reduced.

BACKGROUND

FIG. 1 is a view schematically illustrating a fuel delivery system for a motor vehicle.

Referring to FIG. 1, the fuel delivery system for a motor vehicle delivers a fuel from a fuel tank 10 to a fuel supply line 30 using a fuel pump 20, and supplies the fuel delivered to the fuel supply line 30 to each injector 50 of an engine at constant pressure and flow rate using a pressure regulator 40. Further, the fuel delivery system for a motor vehicle returns the remaining fuel after being supplied to each injector 50 of the engine from the fuel supply line 30 to the fuel tank 10 through a fuel return line 60.

The above-mentioned fuel delivery system for a motor vehicle uses a general direct current (DC) motor as the fuel pump 20. By using the DC motor as the fuel pump, the fuel pump 20 of the fuel delivery system is rotated at a designed speed to deliver the fuel having the same or varying flow rate and pressure to the fuel supply line 30.

FIG. 2 illustrates an exploded perspective view of a brushless direct current (BLDC) motor 100 of a fuel delivery system for a motor vehicle according to the related art. The general BLDC motor 100 used as the fuel pump of the fuel delivery system for a motor vehicle according to the related art includes a cylindrical outer case 110, a stator 120 inserted into the outer case 110, a rotor 130 rotatably inserted into the stator 120, a shaft 135 guiding a rotation of the rotor 130, a pump outlet 140 closing one side of the outer case 110 and including a terminal 145, and a lower-side case 150 closing the other side of the outer case 110 and including an impeller 155 rotated by the rotation of the rotor 130.

The shaft 135 of the BLDC motor 100 according to the related art as described above has an end of one side which is rotatably coupled to the pump outlet 140, and an end of the other side which is rotatably coupled to the lower-side case 150. In particular, one side of the shaft 135 is extended by a significant length in one side direction from one side of the rotor 130 so as to be connected to the pump outlet 140. Accordingly, as a length of the shaft 135 is formed to be long, a support point is apart from the center of gravity of the rotor 130, which causes noise and vibration to be increased.

SUMMARY

An embodiment of the present invention is directed to providing a BLDC motor of a fuel pump for a motor vehicle in which an end of one side of a shaft is coupled to one side of a stator to reduce a length of the shaft such that a support point of the shaft approaches the center of gravity of a rotor.

To this end, an embodiment of the present invention is directed to providing a BLDC motor of a fuel pump for a motor vehicle in which a coupling part formed at one side of the rotor is formed by performing a secondary injection molding for the stator after performing a primary injection molding for the stator.

In one general aspect, a brushless direct current (BLDC) motor of a fuel pump for a motor vehicle, including an outer case, a stator inserted into the outer case, a rotor rotatably inserted into the stator, a shaft formed on a rotation shaft of the rotor, a pump outlet closing one side of the outer case and including a terminal, and a lower-side case closing the other side of the outer case and including a driving body which is rotated by rotation of the rotor, includes: a shaft coupling part formed on one side of the stator and having an end of one side of the shaft which is rotatably coupled thereto.

The shaft coupling part may include a bushing having the end of one side of the shaft which is rotatably coupled thereto; a bushing coupling part disposed at the center of one side of the stator and having the bushing which is coupled and fixed thereto; and a plurality of ribs connecting an outer circumference surface of the bushing coupling part and a circumference surface of one side of the stator.

The shaft coupling part may be formed by first performing a primary injection molding for a molding part of the stator and then performing a secondary injection molding.

The shaft coupling part may be formed on the same line as an end portion of one side of the stator.

DETAILED DESCRIPTION OF MAIN ELEMENTS

| | |
|---|---|
| 500: BLDC motor | |
| 510: outer case | |
| 520: stator | |
| 525: shaft coupling part | |
| 525a: bushing coupling part | 525b: rib |
| 530: rotor | 535: shaft |
| 540: pump outlet | 545: terminal |
| 550: lower-side case | 551: sub stator |
| 552: upper case | 553: lower case |

DETAILED DESCRIPTION OF EMBODIMENTS

Hereinafter, an exemplary embodiment of the present invention will be described in detail with reference to the accompanying drawings.

Figure 1:
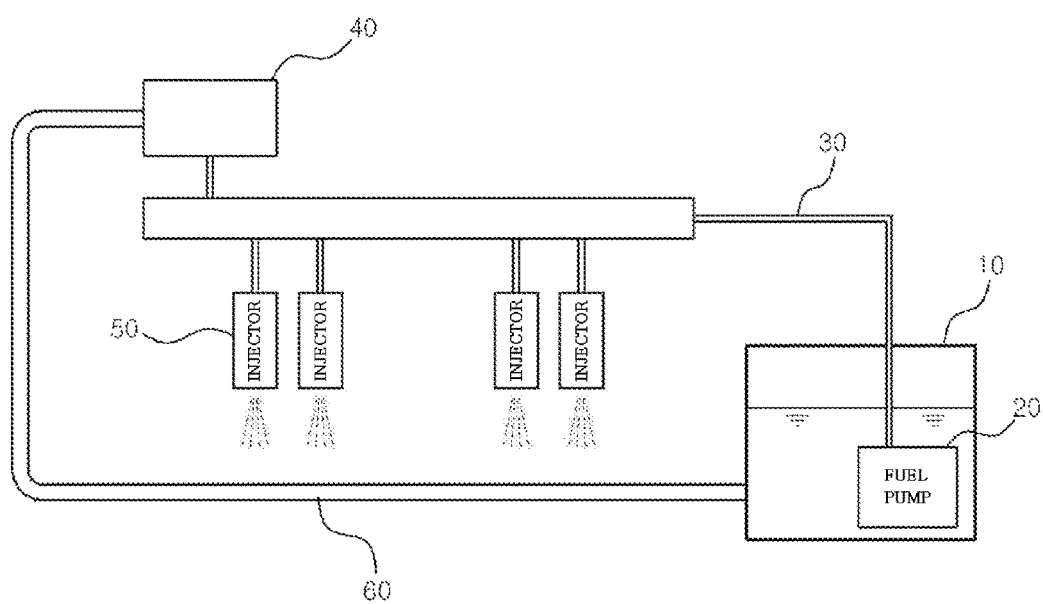
FIG. 1 is a schematic view of a fuel delivery system for a motor vehicle.
Figure 2:
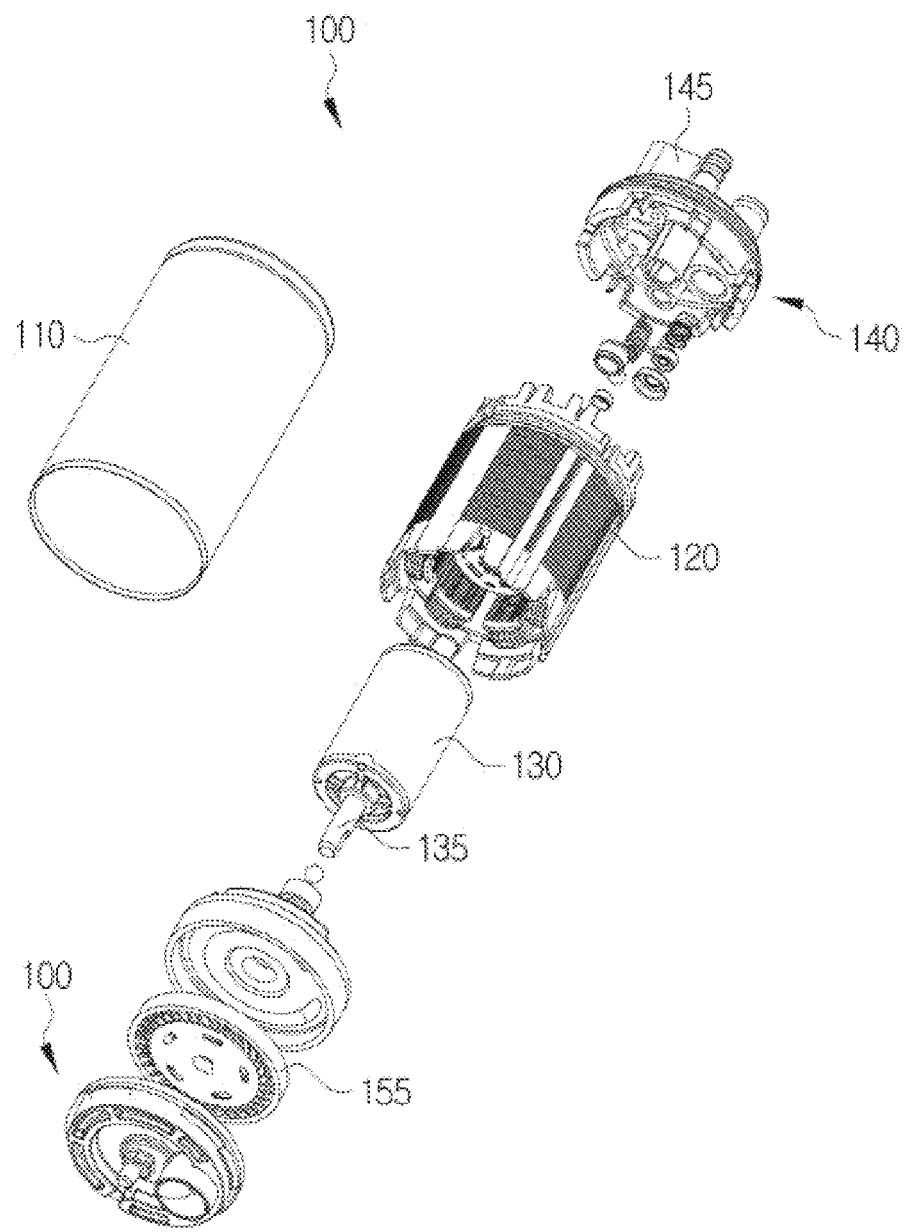
FIG. 2 is an exploded perspective view of a general BLDC motor.
Figure 3:
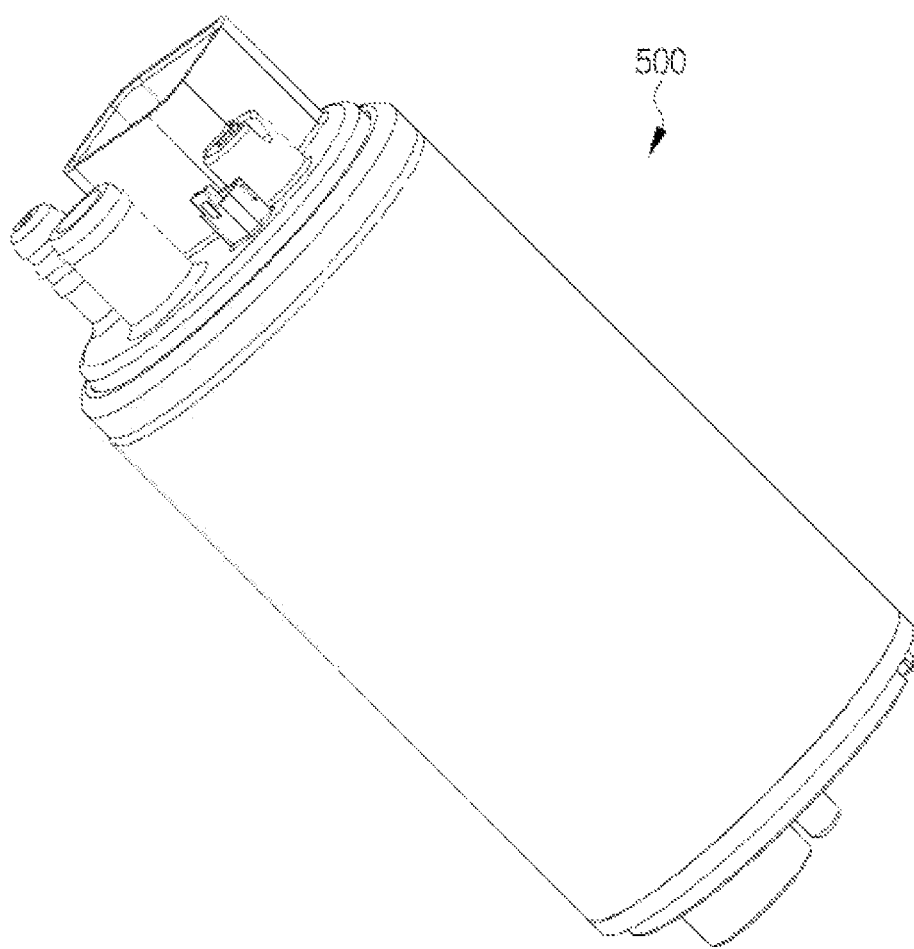
FIG. 3 is a perspective view of a BLDC motor according to an exemplary embodiment of the present invention.
Figure 4:
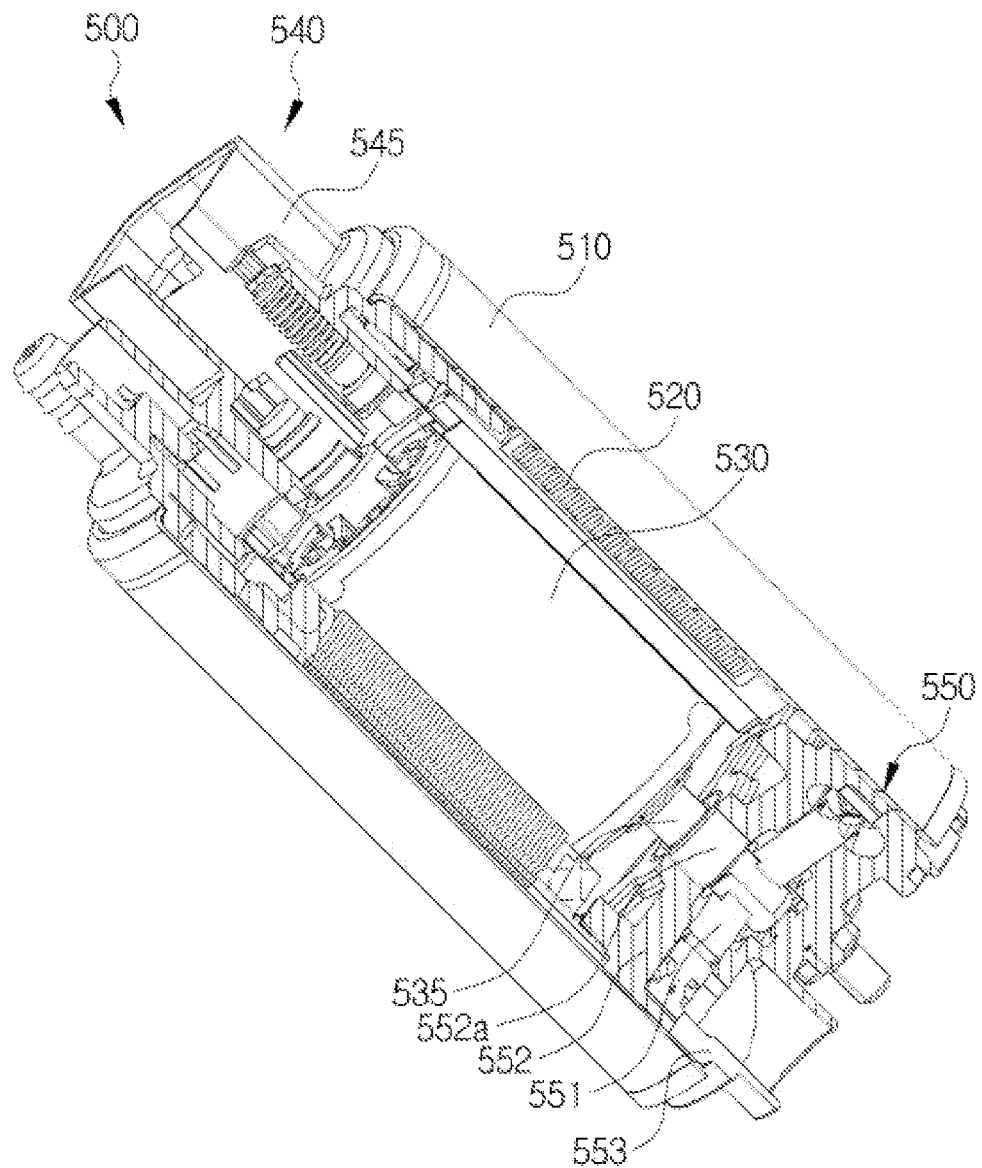
FIG. 4 is a cross-sectional perspective view of the BLDC motor according to an exemplary embodiment of the present invention.

FIG. 3 illustrates a perspective view of a BLDC motor 500 (hereinafter, referred to as "motor") according to an exemplary embodiment of the present invention and FIG. 4 is a cross-sectional perspective view of the BLDC motor 500 according to an exemplary embodiment of the present invention.

As illustrated, the motor 500 is configured to include an outer case 510, a stator 520, a rotor 530, a pump outlet 540, and a lower-side case 550.

The outer case 510 which is formed of a cylindrical resin material has a space into which the stator 520 and the rotor 530 are inserted, and upper and lower sides which may be formed to be opened.

The stator 520 is formed in a cylindrical shape having a predetermined thickness, and has a space into which the rotor 530 is rotatably inserted in a shaft direction. The stator 520 may include a stator, a coil, a connector, and a molding part such as a stator of a typical BLDC motor.

The rotor 530 is configured to be inserted into the stator 520 and be rotatable in the shaft direction by the magnetism of the stator 520. The rotor 530 includes a core, a shaft 535, a magnet, and a molding.

The pump outlet 540 is coupled to an upper side of the outer case 510 so as to close the upper side of the outer case 510, and has a terminal 545 electrically connected to the connector controlling the rotation of the motor 500.

The lower-side case 550 is coupled to the lower side of the outer case 510 so as to close the lower side of the outer case 510, and includes a sub stator 551 which is rotated by receiving the rotation of the rotor 530 through an end of a lower side of the shaft 535, an upper case 552 surrounding an upper side of the sub stator 551 and having the end of the lower side which is rotatably coupled thereto, and a lower case 553 surrounding a lower side of the sub stator 551. The lower side of the shaft 535 may be coupled to be rotatable through a first bushing 552a provided to the center of the upper case 552.

In this case, an upper side of the shaft 535 according to the present invention may be coupled to the stator 520. Hereinafter, a coupling structure between the shaft 535 and the stator 520 according to the present invention will be described in more detail with reference to the drawings.

Figure 5:
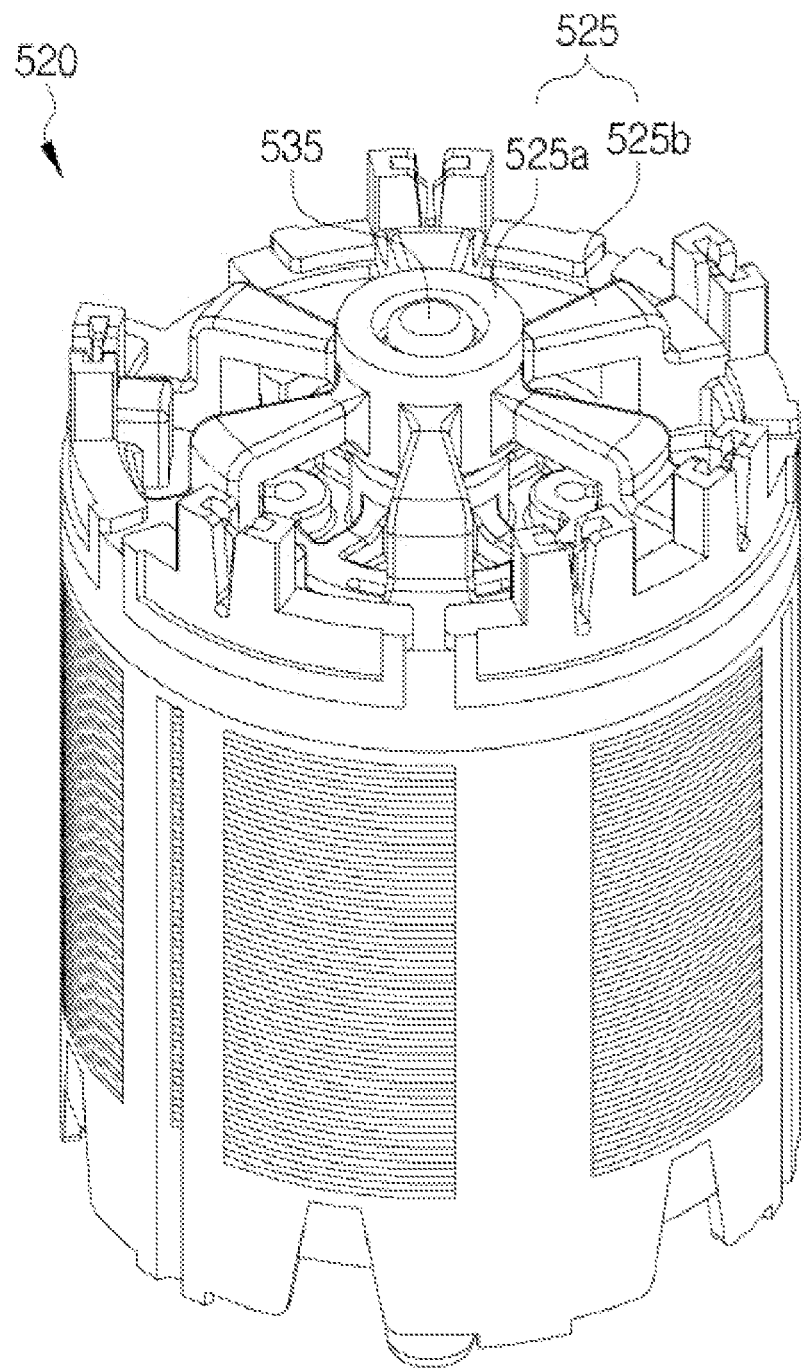
FIG. 5 is a coupling perspective view of a stator and a rotor according to an exemplary embodiment of the present invention.
Figure 6:
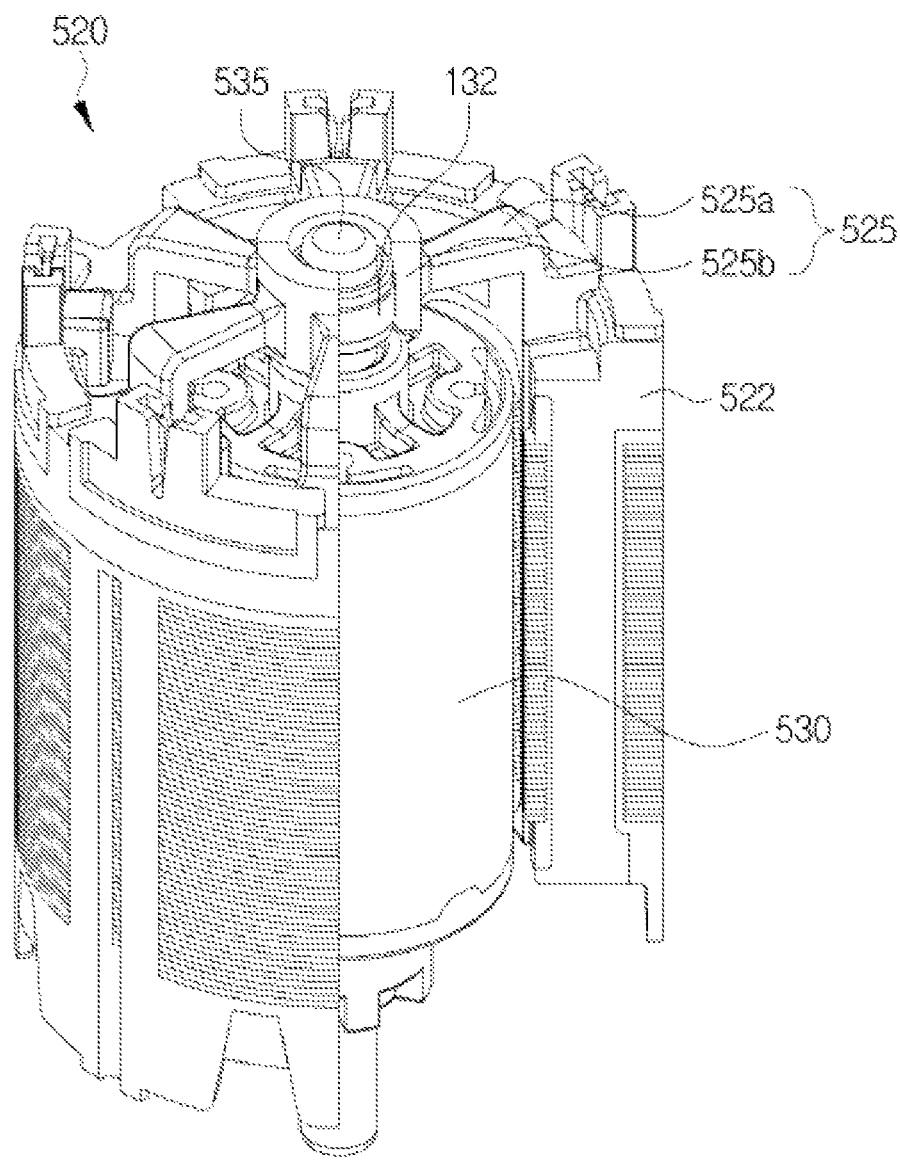
FIG. 6 is a coupling cross-sectional perspective view of the stator and the rotor according to an exemplary embodiment of the present invention.

FIG. 5 illustrates a coupling perspective view of the stator 520 and the rotor 530 according to an exemplary embodiment of the present invention and FIG. 6 is a coupling cross-sectional perspective view of the stator 520 and the rotor 530 according to an exemplary embodiment of the present invention.

As illustrated, a shaft coupling part 525 may be formed on an open surface of one side of the stator 520. The shaft coupling part 525 is configured to include a bushing coupling part 525a into which a second bushing B2 is inserted so that the upper side of the shaft 535 is coupled thereto, and a plurality of ribs 525b connecting an outer circumference surface of the bushing coupling part 525a and a circumference surface of one side of the stator 520 so that the bushing coupling part 525a is fixed to the open surface of one side of the stator 520. The plurality of ribs 525b may be radially disposed so that the bushing coupling part 525a is stably fixed. By the configuration of the shaft coupling part 525 as described above, the upper side of the shaft 535 which is extended from one side of the rotor 530 may be configured to be short. That is, a support point of the upper side of the shaft 535 may be configured to approach the center of gravity of the rotor 530.

In this case, the shaft coupling part 525 may be implemented by a double injection molding.

After the molding part 522 of the stator 520 is first formed by performing a primary injection molding, the coil is wound and the connector is formed. Next, the shaft coupling part 525 is formed by performing a secondary injection molding, thereby making it possible to easily form the shaft coupling part 525 in the stator 520.

In the BLDC motor of the fuel pump for a motor vehicle according to the exemplary embodiment of the present invention, the shaft is coupled to the rotor, such that the support point of the shaft is configured to approach the center of gravity of the rotor, thereby making it possible to significantly reduce the vibration and noise caused by the rotation of the rotor.

A technical spirit of the present invention should not be construed to being limited to the above-mentioned exemplary embodiments. The present invention may be applied to various fields and may be variously modified by those skilled in the art without departing from the scope of the present invention claimed in the claims. Therefore, it is obvious to those skilled in the art that these alterations and modifications fall within the scope of the present invention.

What is claimed is:

1. A brushless direct current (BLDC) motor of a fuel pump for a motor vehicle, including an outer case, a stator inserted into the outer case, a rotor rotatably inserted into the stator, a shaft formed on a rotation shaft of the rotor, a pump outlet closing one side of the outer case and including a terminal, and a lower-side case closing another side of the outer case and including a driving body which is rotated by rotation of the rotor, the BLDC motor comprising:
    a shaft coupling part formed on one side of the stator and having an end of one side of the shaft which is rotatably coupled thereto,
    wherein the shaft coupling part includes:
        a bushing having the end of one side of the shaft which is rotatably coupled thereto;
        a bushing coupling part disposed at a center of one side of the stator and having the bushing which is coupled and fixed thereto; and
        a plurality of ribs connecting an outer circumference surface of the bushing coupling part and a circumference surface of one side of the stator.

2. The BLDC motor of claim 1, wherein the shaft coupling part is formed by first performing a primary injection molding for a molding part of the stator and then performing a secondary injection molding.

3. The BLDC motor of claim 1, wherein the shaft coupling part is formed on the same line as an end portion of one side of the stator.

* * * * *